(12) United States Patent
Thomas et al.

(10) Patent No.: US 12,375,399 B2
(45) Date of Patent: Jul. 29, 2025

(54) SCALABLE MULTI-PLANE FABRIC-LESS CONNECTIVITY FOR PACKET FORWARDING ENGINE

(71) Applicant: Juniper Networks, Inc., Sunnyvale, CA (US)

(72) Inventors: Philip A. Thomas, San Jose, CA (US); Wing Poon, Sunnyvale, CA (US); Ashish Khicha, Karnataka (IN); Harshad B. Agashe, Karnataka (IN); Arghajit Basu, West Bengal (IN); Naveen Kumar Jain, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 251 days.

(21) Appl. No.: 18/056,091

(22) Filed: Nov. 16, 2022

(65) Prior Publication Data

US 2024/0163207 A1    May 16, 2024

(51) Int. Cl.
*H04L 45/42* (2022.01)
*H04L 45/00* (2022.01)
*H04L 49/111* (2022.01)

(52) U.S. Cl.
CPC .......... *H04L 45/42* (2013.01); *H04L 45/566* (2013.01); *H04L 49/111* (2022.05)

(58) Field of Classification Search
CPC ...... H04L 45/42; H04L 45/566; H04L 49/111; H04L 49/25; H04L 49/30; H04L 49/15; H04L 49/00; H04L 49/40
See application file for complete search history.

(56) References Cited

U.S. PATENT DOCUMENTS

| | | | | |
|---|---|---|---|---|
| 7,317,718 B1* | 1/2008 | Kuo | ........................ | H04L 49/30 709/215 |
| 8,369,345 B1* | 2/2013 | Raghunathan | .......... | H04L 49/40 370/399 |
| 8,417,867 B2* | 4/2013 | Wu | ........................ | H04L 49/109 326/38 |
| 9,225,666 B1 | 12/2015 | Aybay | | |
| 10,599,603 B1* | 3/2020 | Agrawal | ................ | H03K 17/81 |
| 2017/0171111 A1 | 6/2017 | Khare et al. | | |

OTHER PUBLICATIONS

Extended European Search Report for Application No. EP23150995, mailed on Aug. 30, 2023, 10 pages.

* cited by examiner

*Primary Examiner* — Mohamed A Kamara
(74) *Attorney, Agent, or Firm* — Harrity & Harrity, LLP

(57) ABSTRACT

A network device includes one or more dies, wherein each die, of the one or more dies includes one or more packet forwarding components and a switch fabric component. The switch fabric component of a particular die, of the one or more dies, may be connected to the one or more forwarding components of the particular die, and may be configured to provide a switching plane for the one or more packet forwarding components of the particular die. A first die, of the one or more dies, may be connected to the one or more packet forwarding components of a second die of the one or more dies, and may be configured to provide a switching plane for the one or more packet forwarding components of the second die. The switch fabric component may be included in each of the one or more dies and the network device does not include a standalone switch fabric component.

20 Claims, 6 Drawing Sheets

SCALABLE MULTI-PLANE FABRIC-LESS CONNECTIVITY FOR PACKET FORWARDING ENGINE

BACKGROUND

A network device, such as a router or a switch, connects computing devices together on a network by using packet switching technology to receive, process, and forward data on the network. An example network device includes a chassis for holding multiple line cards (e.g., that each include one or more packet forwarding components) that provide ports for connecting computing devices to one another. The multiple line cards are typically connected via a switch fabric.

SUMMARY

In some implementations, a die of a network device includes a first set of one or more interface components associated with a first packet forwarding component of the die and a second packet forwarding component of the die; a second set of one or more interface components associated with the first packet forwarding component and the second packet forwarding component; and a switch fabric component connected to the first set of one or more interface components and the second set of one or more interface components.

In some implementations, a network device includes one or more dies, wherein a first die, of the one or more dies, includes: a first packet forwarding component; a second packet forwarding component; and a first switch fabric component connected to the first packet forwarding component and the second packet forwarding component.

In some implementations, a network device includes one or more dies, wherein each die, of the one or more dies includes: one or more packet forwarding components; and a switch fabric component.

DETAILED DESCRIPTION

Figure 1:
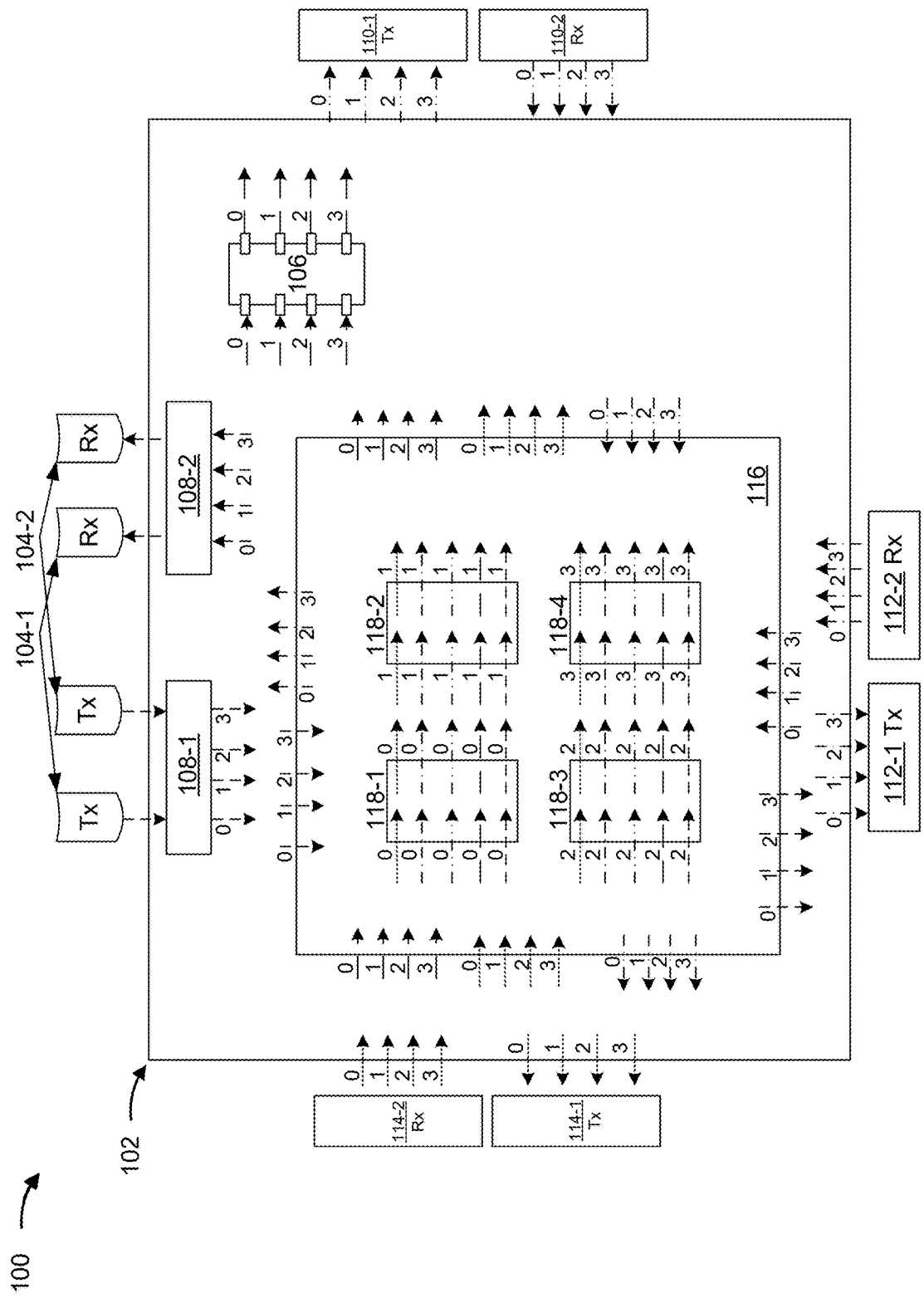
FIG. 1 is a diagram of an example implementation described herein.

The following detailed description of example implementations refers to the accompanying drawings. The same reference numbers in different drawings may identify the same or similar elements.

In some cases, a typical chassis-type network device that includes fabric switch cards is too large to be deployed at a particular physical location. In those cases, a network device with a smaller form factor, such as a "pizza box" network device (e.g., that has form factor similar to that of a pizza box) may be used. Such a network device includes dies (e.g., application specific integrated circuit (ASIC) chips or another type of dies), where each die includes one or more packet forwarding components (e.g., packet forwarding engines (PFEs)). Conventionally, the network device includes a switch fabric to connect the packet forwarding components of the dies (e.g., in a similar manner as that of chassis-type network device)

However, including a switch fabric (e.g., that uses fabric switch cards) in the smaller form factor network device occupies space in the network device that could otherwise be used to include additional dies, or other components, which reduces potential packet switching capabilities of the network device. Further, power resources of the network device are consumed to support enablement of the switch fabric within the network device.

Some implementations described herein provide a network device (e.g., a small form factor network device without fabric switch cards). The network device may include one or more dies, where each die includes one or more packet forwarding components and a switch fabric component. The switch fabric component may be connected to the one or more packet forwarding components, and may therefore provide a switching plane for the one or more packet forwarding components. In some implementations, when the network device includes a plurality of dies, a switch fabric component of a first die may be connected to the one or more packet forwarding components of a second die, and may therefore provide a switching plane for the one or more packet forwarding components of the second die. In this way, configurations of multiple dies (e.g., configurations of two dies, four dies, six dies, and/or eight dies, among other examples, as further described herein) may be included in the network device such that the respective switch fabric components of the multiple dies provide packet switching capabilities for the respective one or more packet forwarding components of the multiple dies.

Accordingly, a separate standalone switch fabric (e.g., that is not included in the one or more dies of the network device) does not need to be included in the network device to connect components of the network device (e.g., because each of the one or more dies includes a switch fabric component). This allows space within the network device that would have otherwise been occupied by the switch fabric to be used by one or more additional dies, or other components, which increases potential packet switching capabilities of the network device (e.g., as compared to a similar-sized network device that includes a separate standalone switch fabric). Moreover, power resources of the network device do not need to be consumed to support enablement of a separate standalone switch fabric.

Moreover, in some implementations, the network device provides a distributed non-blocking switch fabric (e.g., that comprises the switch fabric components of the one or more dies of the network device). The distributed non-blocking switch fabric, when connected to one or more packet forwarding components, provides non-blocking all-to-all connectivity among the one or more packet forwarding components (e.g., due to a network connectivity design for connecting the one or more packet forwarding components). Accordingly, the non-blocking switch fabric may provide NX bandwidth, where N is the number of packet forwarding components and X is the per packet forwarding component bandwidth. In this way, the distributed non-blocking switch fabric saves power resources of the network device (e.g., switch fabric power resources) and physical area within the network device (e.g., on board area of the one or more dies).

Additionally, in some or other applications of the design, the distributed non-blocking switch fabric is a scalable switch fabric (e.g., due to the network connectivity design). For example, the non-blocking switch fabric supports any combination of packet forwarding components being connected to each other in a non-blocking manner. In this way, the distributed non-blocking switch fabric (e.g., due to the network connectivity design) will always be utilized at capacity (e.g., utilized at 100% utilization). That is, the distributed non-blocking switch fabric is very efficient (e.g., 100% efficient) when connecting the one or more dies of the network device together. In contrast, in many cases, a separate standalone switch fabric is not utilized at capacity (e.g., at 100% utilization) and is therefore not as efficient.

FIG. 1 is a diagram of one or more example implementations 100 described herein. Example implementation(s) 100 may include a die 102 (e.g., that is to be included in a network device, such as network device 402 described herein). The die 102 may be an ASIC chip or another type of die.

The die 102 may include one or more packet forwarding components 104. As shown in FIG. 1, the die 102 may include a plurality of packet forwarding components 104 (shown as packet forwarding components 104-1 and 104-2). Each packet forwarding component 104 may include one or more one or more portions for forwarding packets, such as at least one transmission (Tx) portion and at least one reception (Rx) portion. A packet forwarding component 104 may be a PFE, or may be included in a PFE.

The die 102 may further include a switch fabric component 106. The switch fabric component 106 may be configured to provide a switch fabric for at least one of the one or more packet forwarding components 104 of the die 102 and/or at least one packet forwarding component 104 of another die 102 (e.g., as described elsewhere herein). As shown in FIG. 1, the switch fabric component 106 may include a set of one or more physical links associated with input to the switch fabric component 106 (shown with long-dashed arrows as four or more groups of physical links, from 0 to 3) and a set of one or more physical links associated with output from the switch fabric component 106 (shown with long-dashed arrows as four or more groups of physical links, from 0 to 3). The switch fabric component 106 may be connected to at least one packet forwarding component 104 (e.g., a transmission portion of the at least one packet forwarding component 104) to receive packets from the at least one packet forwarding component 104, and may be connected to at least one other packet forwarding component 104 (e.g., a reception portion of the at least one other packet forwarding component 104) to transmit packets to the at least one other packet forwarding component 104 (e.g., as described elsewhere herein). In some implementations, the switch fabric component 106 may be connected to a packet forwarding component 104 (e.g., a transmission portion of the packet forwarding component 104 and a reception portion of the packet forwarding component 104) to receive packets from the packet forwarding component 104, and to transmit packets to the packet forwarding component 104 (e.g., as described elsewhere herein).

The die 102 may further include a plurality of sets of one or more interface components 108 (shown as a set of one or more interface components 108-1 and a set of one or more interface components 108-2). Each set of one or more interface components 108 may include one or more physical links that connect the one or more packet forwarding components 104 to one or more other components of the die 102, such as the switch fabric component 106. For example, as shown in FIG. 1, the set of one or more interface components 108-1 may include one or more physical links (shown with short-dashed arrows as four or more groups of physical links, from 0 to 3) that connect the packet forwarding components 104-1 and 104-2 to other components of the die 102, and the set of one or more interface components 108-2 may include one or more physical links (shown with short-dashed arrows as four or more groups of physical links, from 0 to 3) that connect the packet forwarding components 104-1 and 104-2 to other components of the die 102. Each set of one or more interface components 108 may be associated with respective Tx or Rx portions of the one or more packet forwarding components 104. For example, the set of one or more interface components 108-1 may be configured to receive packets from the packet forwarding components 104-1 and 104-2, and the set of one or more interface components 108-2 may be configured to transmit packets to the packet forwarding components 104-1 and 104-2. In some implementations, each set of one or more interface components 108 may include protocol conversion logic, such as to enable packets that are received from, or sent to, the plurality of packet forwarding components 104 to be processed according to a switch fabric protocol.

The die 102 may further include a plurality of sets of one or more interface components 110 (shown as a set of one or more interface components 110-1 and a set of one or more interface components 110-2). The plurality of sets of one or more interface components 110 may be associated with a particular region of the die 102, such as a "right" side or "east" side of the die 102 shown in FIG. 1. Each set of one or more interface components 110 may include one or more physical links that connect one or more components of the die 102, such as at least one of the one or more packet forwarding components 104 and/or the switch fabric component 106, to one or more other components of another die 102 (e.g., as described elsewhere herein). For example, as shown in FIG. 1, the set of one or more interface components 110-1 may include one or more physical links (shown with dashed-and-double-dotted arrows as four or more groups of physical links, from 0 to 3), and the set of one or more interface components 110-2 may include one or more physical links (shown with dashed-and-double-dotted arrows as four or more groups of physical links, from 0 to 3). Each set of one or more interface components 110 may be associated with Tx from the die 102 or Rx by the die 102. For example, the set of one or more interface components 110-1 may be configured to transmit packets from one or more components of the die 102, and the set of one or more interface components 110-2 may be configured to receive packets sent to one or more components of the die 102.

The die 102 may further include a plurality of sets of one or more interface components 112 (shown as a set of one or more interface components 112-1 and a set of one or more interface components 112-2). The plurality of sets of one or more interface components 112 may be associated with a particular region of the die 102, such as a "bottom" side or "south" side of the die 102 shown in FIG. 1. Each set of one or more interface components 112 may include one or more physical links that connect one or more components of the die 102, such as at least one of the one or more packet forwarding components 104 and/or the switch fabric component 106, to one or more other components of another die 102 (e.g., as described elsewhere herein). For example, as shown in FIG. 1, the set of one or more interface components 112-1 may include one or more physical links (shown with dashed-and-single-dotted arrows as four or more groups of physical links, from 0 to 3) and the set of one or more interface components 112-2 may include one or more physical links (shown with dashed-and-single-dotted arrows as four or more groups of physical links, from 0 to 3). Each set of one or more interface components 112 may be associated with Tx from the die 102 or Rx by the die 102. For example, the set of one or more interface components 112-1 may be configured to transmit packets from one or more components of the die 102, and the set of one or more interface components 112-2 may be configured to receive packets sent to one or more components of the die 102.

The die 102 may further include a plurality of sets of one or more interface components 114 (shown as a set of one or more interface components 114-1 and a set of one or more interface components 114-2). The plurality of sets of one or more interface components 114 may be associated with a particular region of the die 102, such as a "left" side or "west" side of the die 102 shown in FIG. 1. Each set of one or more interface components 114 may include one or more physical links that connect one or more components of the die 102, such as at least one of the one or more packet forwarding components 104 and/or the switch fabric component 106, to one or more other components of another die 102 (e.g., as described elsewhere herein). For example, as shown in FIG. 1, the set of one or more interface components 114-1 may include one or more physical links (shown with dotted arrows as four or more groups of physical links, from 0 to 3), and the set of one or more interface components 114-2 may include one or more physical links (shown with dotted arrows as four physical or more groups of links, from 0 to 3). Each set of one or more interface components 114 may be associated with Tx from the die 102 or Rx by the die 102. For example, the set of one or more interface components 114-1 may be configured to transmit packets from one or more components of the die 102, and the set of one or more interface components 114-2 may be configured to receive packets sent to one or more components of the die 102.

In some implementations, the die 102 may include a crossbar switch component 116. The crossbar switch component 116 may be configured to connect components of the die 102 to each other. For example, the crossbar switch component 116 may be configured to connect at least two of the plurality of packet forwarding components 104, the switch fabric component 106, the plurality of sets of one or more interface components 108, the plurality of sets of one or more interface components 110, the plurality of sets of one or more interface components 112, or the plurality of sets of one or more interface components 114. As shown in FIG. 1, the crossbar switch component 116 may comprise one or more switches 118 (shown as 5×5 switches 118-1 to 118-4), or may be n×n crossbar, such as comprising a Clos switch of n×m switches, m×m switches, m×n switches, and/or any other equivalent.

As indicated above, FIG. 1 is provided merely as an example. Other examples may differ from what is described with regard to FIG. 1.

FIGS. 2A-2D are diagrams of one or more example implementations 200 described herein. Example implementation(s) 200 may include one or more dies 102 (e.g., that are to be included in a network device, such as the network device 402 described herein).

Figure 2A:
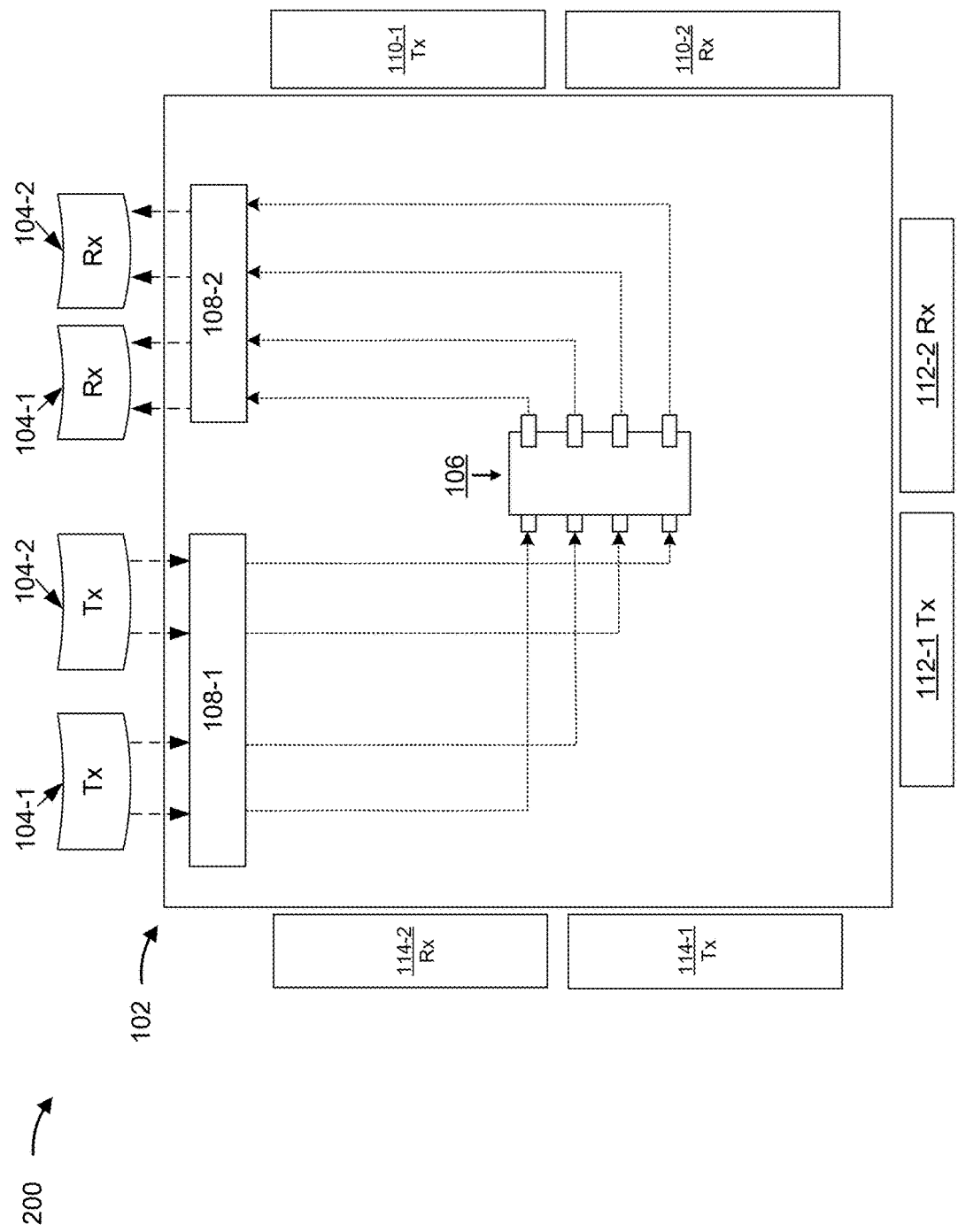
FIGS. 2A-2D are diagrams of one or more example implementations described herein.

FIG. 2A shows a configuration when the one or more dies 102 include a single die 102. As shown in FIG. 2A, the die 102 the switch fabric component 106 is connected to the one or more packet forwarding components 104, such as via the plurality of sets of one or more interface components 108 (and/or the crossbar switch component 116, not shown in FIG. 2A). As further shown in FIG. 2A, the switch fabric component 106 may be connected to the packet forwarding component 104-1 and the packet forwarding component 104-2 via the set of one or more interface components 108-1 and the set of one or more interface components 108-2. In this way, the switch fabric component 106 may be configured to provide a switching plane for the plurality of packet forwarding components 104. For example, the switch fabric component 106 may be configured to provide a switching plane for packets transmitted from the Tx portions of the packet forwarding component 104-1 and the packet forwarding component 104-2 to corresponding Rx portions of the packet forwarding component 104-1 and the packet forwarding component 104-2 (e.g., transmit packets from the Tx portion of the packet forwarding component 104-1 to the Rx portion of the packet forwarding component 104-2, and transmit packets from the Tx portion of the packet forwarding component 104-2 to the Rx portion of the packet forwarding component 104-1). In some implementations, the switch fabric component 106 may be configured to provide a switching plane for a single packet forwarding component 104, such as for packets transmitted from a Tx portion of the packet forwarding component 104 to an Rx portion of the packet forwarding component 104.

Figure 2B:
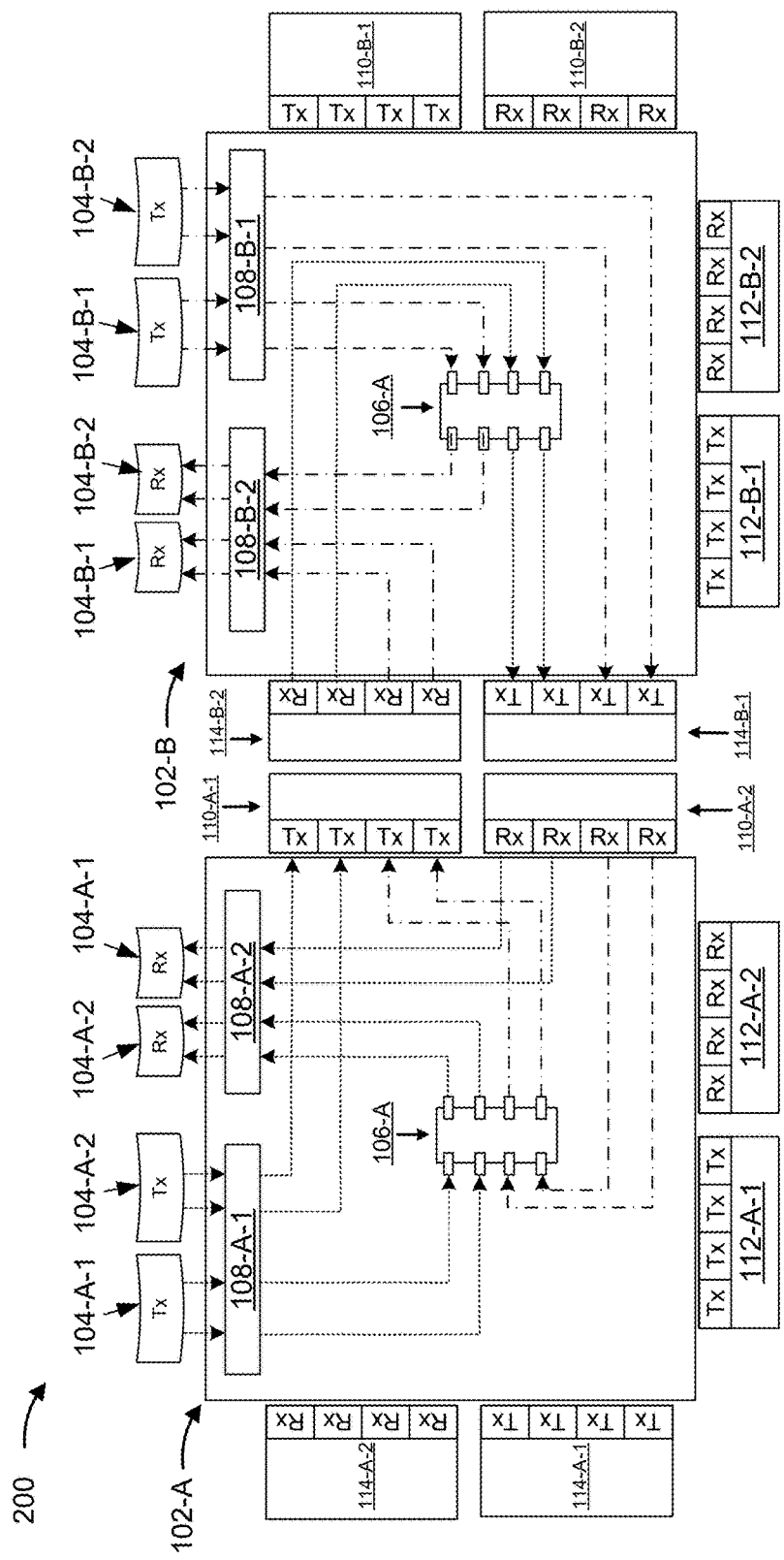

FIG. 2B shows an example configuration when the one or more dies 102 include two dies 102 (shown as dies 102-A and 102-B). Each die 102 may include one or more packet forwarding components 104, a switch fabric component 106, a plurality of sets of one or more interface components 108, a plurality of sets of one or more interface components 110, a plurality of sets of one or more interface components 112, a plurality of sets of one or more interface components 114, and/or a crossbar switch component 116. For example, the die 102-A may include a plurality of packet forwarding components 104-A (shown as packet forwarding components 104-A-1 and 104-A-2), a switch fabric component 106-A, a plurality of sets of one or more interface components 108-A (shown as a set of one or more interface components 108-A-1 and a set of one or more interface components 108-A-2), a plurality of sets of one or more interface components 110-A (shown as a set of one or more interface components 110-A-1 and a set of one or more interface components 110-A-2), a plurality of sets of one or more interface components 112-A (shown as a set of one or more interface components 112-A-1 and a set of one or more interface components 112-A-2), a plurality of sets of one or more interface components 114-A (shown as a set of one or more interface components 114-A-1 and a set of one or more interface components 114-A-2), and/or a crossbar switch component 116-A (not shown in FIG. 2B). As another example, the die 102-B may include a plurality of packet forwarding components 104-B (shown as packet forwarding components 104-B-1 and 104-B-2), a switch fabric component 106-B, a plurality of sets of one or more interface components 108-B (shown as a set of one or more interface components 108-B-1 and a set of one or more interface components 108-B-2), a plurality of sets of one or more interface components 110-B (shown as a set of one or more interface components 110-B-1 and a set of one or more interface components 110-B-2), a plurality of sets of one or more interface components 112-B (shown as a set of one or more interface components 112-B-1 and a set of one or more interface components 112-B-2), a plurality of sets of one or more interface components 114-B (shown as a set of one or more interface components 114-B-1 and a set of one or more interface components 114-B-2), and/or a crossbar switch component 116-B (not shown in FIG. 2B).

In some implementations, a switch fabric component 106 of one of the two dies 102 may be connected to the respective one or more forwarding components 104 of the two dies 102. For example, as shown in FIG. 2B, the switch fabric component 106-A may be connected to the packet forwarding component 104-A-1 and the packet forwarding component 104-A-2 of the die 102-A via the set of one or more interface components 108-A-1 and the set of one or more interface components 108-A-2 of the die 102-A. Additionally, the switch fabric component 106-A may be connected to the packet forwarding component 104-B-1 and the packet forwarding component 104-B-2 of the die 102-B via the set of one or more interface components 110-A-1 and the set of one or more interface components 110-A-2 of the die 102-A (and via the set of one or more interface components 114-B-1, the set of one or more interface components 114-B-2, the set of one or more interface components 108-B-1, and the set of one or more interface components 108-B-2 of the die 102-B). In this way, the switch fabric component 106-A may be configured to provide a switching plane for the respective one or more forwarding components 104 of the two dies 102. For example, the switch fabric component 106-A may be configured to provide a switching plane for packets transmitted from the Tx portions of the packet forwarding components 104-A-1 and 104-A-2 to corresponding Rx portions of the packet forwarding components 104-A-1 and 104-A-2 (e.g., as shown by short-dashed arrows in FIG. 2B), and for packets transmitted from the Tx portions of the packet forwarding components 104-B-1 and 104-B-2 to corresponding Rx portions of the packet forwarding components 104-B-1 and 104-B-2 (e.g., as shown by dashed-and-single-dotted arrows in FIG. 2B).

As another example, as shown in FIG. 2B, the switch fabric component 106-B may be connected to the packet forwarding component 104-B-1 and the packet forwarding component 104-B-2 of the die 102-B via the set of one or more interface components 108-B-1 and the set of one or more interface components 108-B-2 of the die 102-B. Additionally, the switch fabric component 106-B may be connected to the packet forwarding component 104-A-1 and the packet forwarding component 104-A-2 of the die 102-A via the set of one or more interface components 114-B-1 and the set of one or more interface components 114-B-2 of the die 102-B (and via the set of one or more interface components 110-A-1, the set of one or more interface components 110-A-2, the set of one or more interface components 108-A-1, and the set of one or more interface components 108-A-2 of the die 102-A). In this way, the switch fabric component 106-B may be configured to provide a switching plane for the respective one or more packet forwarding components 104 of the two dies 102. For example, the switch fabric component 106-A may be configured to provide a switching plane for packets transmitted from the Tx portions of the packet forwarding components 104-B-1 and 104-B-2 to corresponding Rx portions of the packet forwarding components 104-B-1 and 104-B-2 (e.g., as shown by dashed-and-single-dotted arrows in FIG. 2B), and for packets transmitted from the Tx portions of the packet forwarding components 104-A-1 and 104-A-2 to corresponding Rx portions of the packet forwarding components 104-A-1 and 104-A-2 (e.g., as shown by short-dashed arrows in FIG. 2B).

Figure 2C:
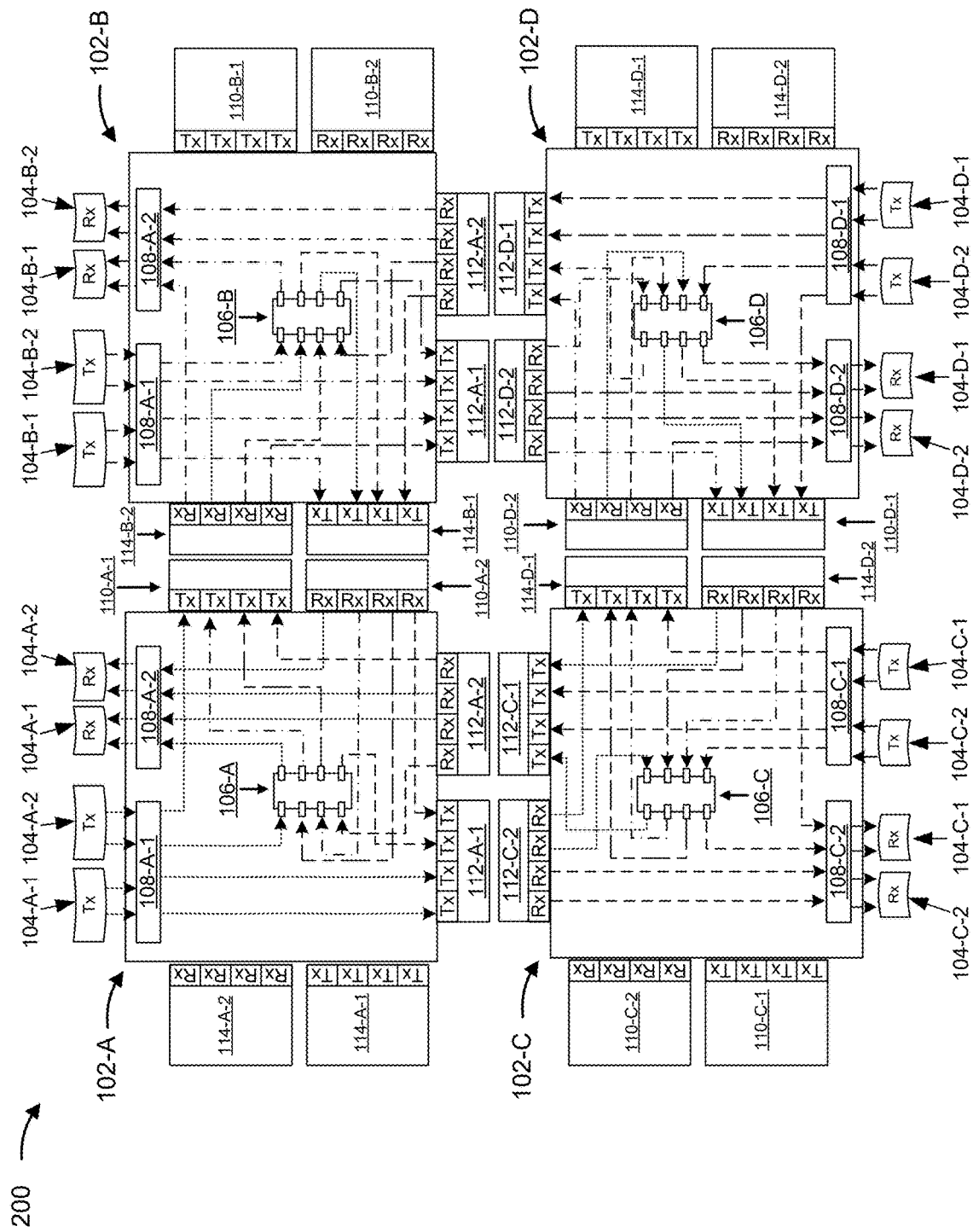

FIG. 2C shows an example configuration when the one or more dies 102 include four dies 102 (shown as dies 102-A, 102-B, 102-C, and 102-D). Each die 102 may include one or more packet forwarding components 104, a switch fabric component 106, a plurality of sets of one or more interface components 108, a plurality of sets of one or more interface components 110, a plurality of sets of one or more interface components 112, a plurality of sets of one or more interface components 114, and/or a crossbar switch component 116 (e.g., in a same, or similar manner, as described elsewhere herein).

In some implementations, a switch fabric component 106 of one of the four dies 102 may be connected to the respective one or more packet forwarding components 104 of the four dies 102. For example, as shown in FIG. 2B, the switch fabric component 106-A may be connected to the packet forwarding component 104-A-1 and the packet forwarding component 104-A-2 of the die 102-A via the set of one or more interface components 108-A-1 and the set of one or more interface components 108-A-2 of the die 102-A. Additionally, the switch fabric component 106-A may be connected to the packet forwarding component 104-B-1 and the packet forwarding component 104-B-2 of the die 102-B via the set of one or more interface components 110-A-1 and the set of one or more interface components 110-A-2 of the die 102-A (and via the set of one or more interface components 114-B-1, the set of one or more interface components 114-B-2, the set of one or more interface components 108-B-1, and the set of one or more interface components 108-B-2 of the die 102-B); the packet forwarding component 104-C-1 and the packet forwarding component 104-C-2 of the die 102-C via the set of one or more interface components 112-A-1 and the set of one or more interface components 112-A-2 of the die 102-A (and via the set of one or more interface components 112-C-1, the set of one or more interface components 112-C-2, the set of one or more interface components 108-C-1, and the set of one or more interface components 108-C-2 of the die 102-C); and the packet forwarding component 104-D-1 and the packet forwarding component 104-D-2 of the die 102-C via the set of one or more interface components 110-A-1 and the set of one or more interface components 110-A-2 of the die 102-A (and via the set of one or more interface components 112-D-1, the set of one or more interface components 112-D-2, the set of one or more interface components 108-D-1, and the set of one or more interface components 108-D-2 of the die 102-D; and via the set of one or more interface components 112-B-1, the set of one or more interface components 112-B-2, the set of one or more interface components 114-B-1, and the set of one or more interface components 114-B-2 of the die 102-B).

In this way, the switch fabric component 106-A may be configured to provide a switching plane for the respective one or more packet forwarding components 104 of the four dies 102. For example, the switch fabric component 106-A may be configured to provide a switching plane for packets transmitted from the Tx portions of the packet forwarding components 104-A-1 and 104-A-2 to corresponding Rx portions of the packet forwarding components 104-A-1 and 104-A-2 (e.g., as shown by short-dashed arrows in FIG. 2B), for packets transmitted from the Tx portions of the packet forwarding components 104-B-1 and 104-B-2 to corresponding Rx portions of the packet forwarding components 104-B-1 and 104-B-2 (e.g., as shown by dashed-and-single-dotted arrows in FIG. 2B), for packets transmitted from the Tx portions of the packet forwarding components 104-C-1 and 104-C-2 to corresponding Rx portions of the packet forwarding components 104-C-1 and 104-C-2 (e.g., as shown by dashed arrows in FIG. 2B), for packets transmitted from the Tx portions of the packet forwarding components 104-D-1 and 104-D-2 to corresponding Rx portions of the packet forwarding components 104-D-1 and 104-D-2 (e.g., as shown by long-and-short-dashed arrows in FIG. 2B). Accordingly, each switch fabric component 106 may be configured to provide a switching plane for the respective one or more packet forwarding components 104 of the four dies 102 (e.g., in a similar manner as that described herein in relation to the switch fabric component 106-A).

In some implementations, a switch fabric component 106 of a first die 102, of a plurality of dies 102, may be connected to one or more packet forwarding components 104 of the first die 102. Additionally, or alternatively, the switch fabric component 106 of the first die 102 may be connected to one or more packet forwarding components 104 of a second die 102 of the plurality of dies 102 and/or may not be connected to one or more packet forwarding components 104 of a third die 102 of the plurality of dies 102. That is, the switch fabric component 106 may be configured to provide a switch plane for the one or more packet forwarding components 104 of the first die 102 and/or the one or more packet forwarding components 104 of the second die 102, but may not be configured to provide the switch plane for the one or more packet forwarding components 104 of the third die 102.

Figure 2D:
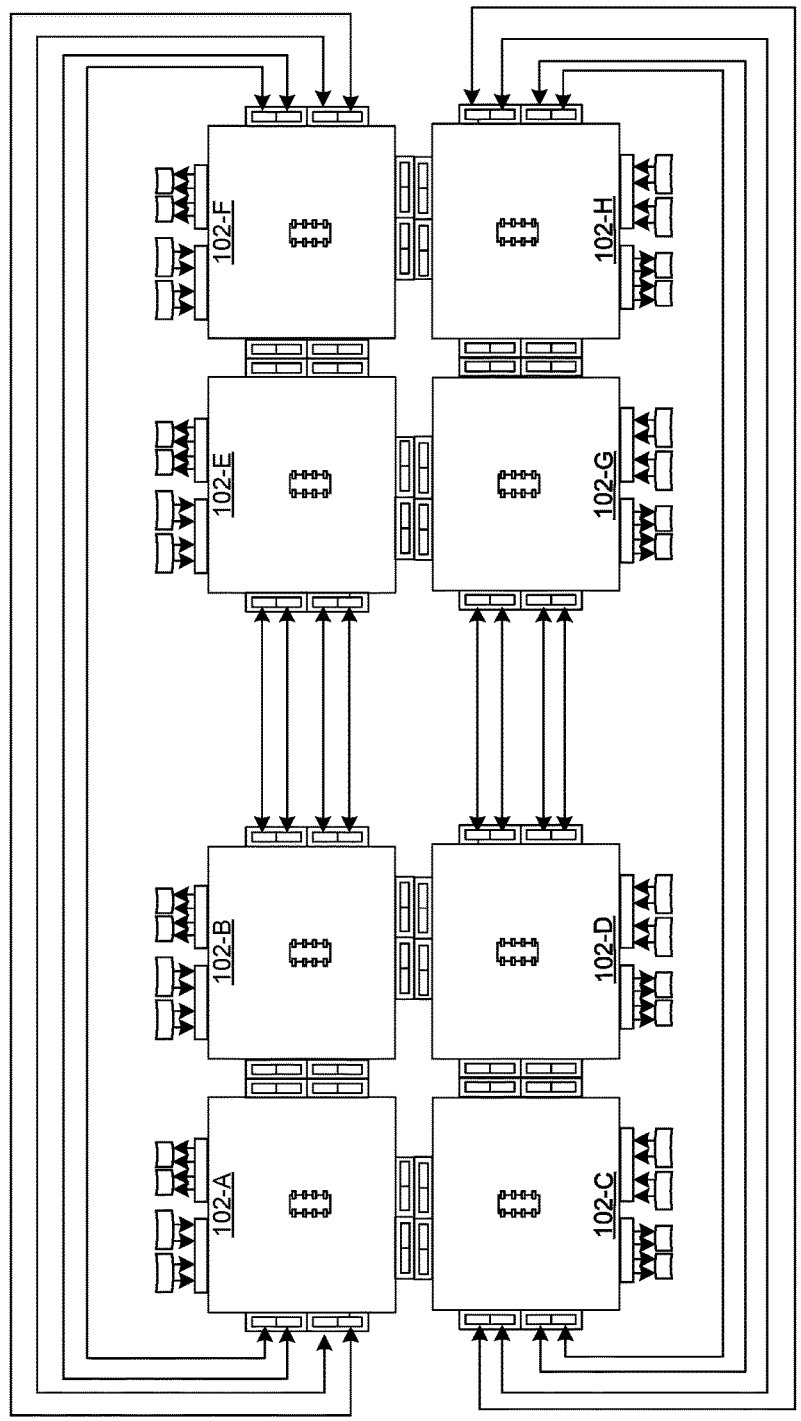

FIG. 2D shows an example configuration when the one or more dies 102 include eight dies 102 (shown as dies 102-A through 102-H). Each die 102 may include one or more packet forwarding components 104, a switch fabric component 106, a plurality of sets of one or more interface components 108, a plurality of sets of one or more interface components 110, a plurality of sets of one or more interface components 112, a plurality of sets of one or more interface components 114, and/or a crossbar switch component 116 (e.g., in a same, or similar manner, as described elsewhere herein). The switch fabric component 106 may be connected to (or not connected to) the one or more packet forwarding components 104 of the die 102 and/or one or more other packet forwarding components 104 of another die 102, of the eight dies 102, as described above.

While implementations described herein include one die 102, two dies 102, four dies 102, and eight dies 102, any number of dies 102 are contemplated. For example, in another example configuration, the one or more dies 102 include six dies 102. Each die 102 may include one or more packet forwarding components 104, a switch fabric component 106, a plurality of sets of one or more interface components 108, a plurality of sets of one or more interface components 110, a plurality of sets of one or more interface components 112, a plurality of sets of one or more interface components 114, and/or a crossbar switch component 116 (e.g., in a same, or similar manner, as described elsewhere herein). The switch fabric component 106 may be connected to (or not connected to) the one or more packet forwarding components 104 of the die 102 and/or one or more other packet forwarding components 104 of another die 102, of the eight dies 102, as described above.

As indicated above, FIGS. 2A-2D are provided merely as one or more examples. Other examples may differ from what is described with regard to FIGS. 2A-2D.

Figure 3:
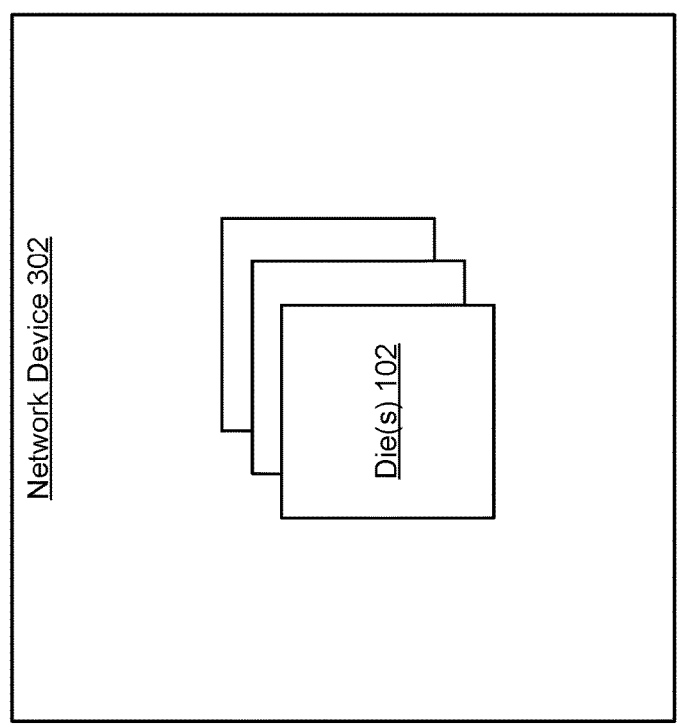
FIG. 3 is a diagram of one or more example implementations described herein.

FIG. 3 is a diagram of one or more example implementations 300 described herein. Example implementation(s) 300 may include a network device 302 that includes one or more dies 102 (e.g., described herein).

The network device 302 may include one or more devices capable of receiving, processing, storing, routing, and/or providing traffic (e.g., a packet and/or other information or metadata) in a manner described herein. For example, the network device 302 may include a router, such as a label switching router (LSR), a label edge router (LER), an ingress router, an egress router, a provider router (e.g., a provider edge router or a provider core router), a virtual router, or another type of router. Additionally, or alternatively, the network device 302 may include a gateway, a switch, a firewall, a hub, a bridge, a reverse proxy, a server (e.g., a proxy server, a cloud server, or a data center server), a load balancer, and/or a similar device. In some implementations, the network device 302 may be a physical device implemented within a housing, such as a "pizza box" housing (e.g., a non-chassis housing that has a small flat form factor like a pizza box). In some implementations, the network device 302 may include the one or more dies 102. Accordingly, a standalone switch fabric does not need to be included to connect components of the network device 302 (e.g., because each of the one or more dies 102 includes a switch fabric component 106).

As indicated above, FIG. 3 is provided merely as one or more examples. Other examples may differ from what is described with regard to FIG. 3.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, traffic or content may include a set of packets. A packet may refer to a communication structure for communicating information, such as a protocol data unit (PDU), a service data unit (SDU), a network packet, a datagram, a segment, a message, a block, a frame (e.g., an Ethernet frame), a portion of any of the above, and/or another type of formatted or unformatted unit of data capable of being transmitted via a network.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A die of a network device, comprising:
a first set of one or more interface components associated with a first packet forwarding component of the die and a second packet forwarding component of the die;
a second set of one or more interface components associated with the first packet forwarding component and the second packet forwarding component; and
a switch fabric component connected to the first set of one or more interface components and the second set of one or more interface components,
wherein the switch fabric component is included in the die, and the network device does not include a standalone switch fabric component.

2. The die of claim 1, wherein the switch fabric component is configured to provide a switching plane for the first packet forwarding component and the second packet forwarding component.

3. The die of claim 1, further comprising:
a third set of one or more interface components associated with a third packet forwarding component of another die and a fourth packet forwarding component of the other die; and
a fourth set of one or more interface components associated with the third packet forwarding component of another die and the fourth packet forwarding component of the other die,
wherein the switch fabric component is additionally connected to the third set of one or more interface components and the fourth set of one or more interface components.

4. The die of claim 3, wherein the switch fabric component is configured to provide a switching plane for the first packet forwarding component, the second packet forwarding component, the third packet forwarding component, and the fourth packet forwarding component.

5. The die of claim 1, further comprising:
a third set of one or more interface components associated with a third packet forwarding component of a first other die and a fourth packet forwarding component of the first other die, and associated with a fifth packet forwarding component of a second other die and a sixth packet forwarding component of the second other die;
a fourth set of one or more interface components associated with the third packet forwarding component of the first other die and the fourth packet forwarding component of the first other die, and associated with the fifth packet forwarding component of the second other die and the sixth packet forwarding component of the second other die;
a fifth set of one or more interface components associated with a seventh packet forwarding component of a third other die and an eighth packet forwarding component of the third other die; and
a sixth set of one or more interface components associated with the seventh packet forwarding component of the third other die and the eighth packet forwarding component of the third other die,
wherein the switch fabric component is additionally connected to the third set of one or more interface components, the fourth set of one or more interface components, the fifth set of one or more interface components, and the sixth set of one or more interface components.

6. The die of claim 5, wherein the switch fabric component is configured to provide a switching plane for the first packet forwarding component, the second packet forwarding component, the third packet forwarding component, the fourth packet forwarding component, the fifth packet forwarding component, the sixth packet forwarding component, the seventh packet forwarding component, and the eighth packet forwarding component.

7. A network device, comprising:
one or more dies, wherein a first die, of the one or more dies, includes:
a first packet forwarding component;
a second packet forwarding component; and
a first switch fabric component connected to the first packet forwarding component and the second packet forwarding component,
wherein the first switch fabric component is included in the first die and the network device does not include a standalone switch fabric component that is not within each of the one or more dies.

8. The network device of claim 7, wherein the first switch fabric component is configured to provide a first switching plane for the first packet forwarding component and the second packet forwarding component.

9. The network device of claim 7, wherein the one or more dies includes the first die and a second die,
wherein the second die includes:
a third packet forwarding component;
a fourth packet forwarding component; and
a second switch fabric component, wherein:
the second switch fabric component is connected to the first packet forwarding component, the second packet forwarding component, the third packet forwarding component, and the fourth packet forwarding component, and
the first switch fabric component is additionally connected to the third packet forwarding component and the fourth packet forwarding component.

10. The network device of claim 9, wherein:
the first switch fabric component is configured to provide a first switching plane for the first packet forwarding component, the second packet forwarding component, the third packet forwarding component, and the fourth packet forwarding component; and
the second switch fabric component is configured to provide a second switching plane for the first packet forwarding component, the second packet forwarding component, the third packet forwarding component, and the fourth packet forwarding component.

11. The network device of claim 7, wherein the one or more dies includes the first die, a second die, a third die, and a fourth die, wherein:
the second die includes a third packet forwarding component, a fourth packet forwarding component, and a second switch fabric component;
the third die includes a fifth packet forwarding component, a sixth packet forwarding component, and a third switch fabric component; and
the fourth die includes a seventh packet forwarding component, an eighth packet forwarding component, and a fourth switch fabric component.

12. The network device of claim 11, wherein:
each switch fabric component of the first switch fabric component, the second switch fabric component, the third switch fabric component, and the fourth switch fabric component is connected to:
the first packet forwarding component, the second packet forwarding component, the third packet forwarding component, the fourth packet forwarding component, the fifth packet forwarding component, the sixth packet forwarding component, the seventh packet forwarding component, or the eighth packet forwarding component.

13. The network device of claim 11, wherein:
each switch fabric component of the first switch fabric component, the second switch fabric component, the third switch fabric component, and the fourth switch fabric component is configured to provide a switching plane for the first packet forwarding component, the second packet forwarding component, the third packet forwarding component, the fourth packet forwarding component, the fifth packet forwarding component, the sixth packet forwarding component, the seventh packet forwarding component, or the eighth packet forwarding component.

14. A network device, comprising:
one or more dies, wherein each die, of the one or more dies, includes:
one or more packet forwarding components; and
a switch fabric component,
wherein the switch fabric component is included in each of the one or more dies and the network device does not include a standalone switch fabric component.

15. The network device of claim 14, wherein the switch fabric component of a particular die, of the one or more dies, is connected to the one or more packet forwarding components of the particular die.

16. The network device of claim 14, wherein the switch fabric component of a first die, of the one or more dies, is connected to the one or more packet forwarding components of a second die of the one or more dies.

17. The network device of claim 16, wherein the switch fabric component of the first die is not connected to the one or more forwarding components of a third die of the one or more dies.

18. The network device of claim 14, wherein the switch fabric component of a particular die, of the one or more dies, is configured to provide a switching plane for the one or more packet forwarding components of the particular die.

19. The network device of claim 14, wherein the switch fabric component of a first die, of the one or more dies, is configured to provide a switching plane for the one or more packet forwarding components of a second die of the one or more dies.

20. The network device of claim 19, wherein the switch fabric component of the first die is not configured to provide the switching plane for the one or more packet forwarding components of a third die of the one or more dies.

* * * * *